United States Patent [19]

Dalton

[11] 4,075,777
[45] Feb. 28, 1978

[54] BAIT CASTING FLOAT

[76] Inventor: Robert D. Dalton, 3819 Maryland Drive, Doraville, Ga. 30340

[21] Appl. No.: 705,788

[22] Filed: Jul. 16, 1976

[51] Int. Cl.² .............................................. A01K 97/04
[52] U.S. Cl. ...................................................... 43/41.2
[58] Field of Search ......................................... 43/41.2

[56] References Cited

U.S. PATENT DOCUMENTS

| 2,910,798 | 11/1959 | Bias | 43/41.2 |
| 3,063,187 | 11/1962 | Abdelmaseh | 43/41.2 |
| 3,208,182 | 9/1965 | Holthaus | 43/41.2 |

Primary Examiner—Louis G. Mancene
Assistant Examiner—Daniel J. Leach
Attorney, Agent, or Firm—James A. Hinkle

[57] ABSTRACT

A bait casting float in which bait to be protected is placed into a hollow end of the float, then cast upon the water, thereby saving the bait from damage as the float impacts in the water. The float is of a thin-walled elongated configuration, being flared at one end and having an elongated nipple at the other end defining a floatation chamber. Air is maintained in the floatation chamber by means of a seated spherical ball trapping air in said chamber and which, in turn, is a floatation member.

2 Claims, 4 Drawing Figures

BAIT CASTING FLOAT

The present invention relates in general to fishing bobbers, and more particularly to bait casting floats having incorporated therein a bobber and a bait guard.

It has been known in the past that bait guards are used by fishermen for casting bait, either by hand, line or from a casting rod. Bait guards of the type previously known usually consist of a cup in which the baited hook and sinker is placed so that the bait may be protected during the cast and also to protect it from impact when it hits the water. Normally, one end of the bait guard is provided with a float member so that the bait cup portion will float with its open end downward and the bait and sinker will then fall from the cup by gravity.

In the past fishermen have experienced difficulty in the known types of bait guards, normally due to the flight characteristics of the device when it is cast. Frequently, the aerodynamic configuration of the device is such that during the casting process the bait becomes dislodged from the bait cup portion of the device thereby hitting the water apart from the device which will in turn injure or cripple the bait to such a degree that it is not functional for fishing.

The overall purpose of this invention is to protect the bait so that when the float hits the water the bait will be fully protected therein.

This particular invention relates to a casting and fishing float which has for an object the provision of an improved floating portion for use particularly in connection with live bait or other soft bait, but also usable with other types of baits or lures to protect the bait from damage while it is being cast. The term bait shall interchangeably be used to include all types of baits or lures that may be used in conjunction with this invention.

A further object of this invention is the provision of a bait casting float in combination with a slidable line which is adjustable such that the bait is suspended therefrom at a readily adjustable desired depth within the water.

A further object of this invention is the provision of a bait casting float which will support and protect the bait as it is being cast into the water.

Yet another object of this invention is the provision of a bait casting float that not only protects the bait as it is being cast but also acts as a bobber to support the baited end of the line at a predetermined desired depth and at the same time will provide a visual indicator of the location of the suspended bait.

Still another object of this invention is the provision of an improved float member which is easily manufactured and is of low cost as compared to anything in the prior art.

Further aims, objects and advantages of this invention will appear from the consideration of the following description and the accompanying drawings, showing for purely illustrative purposes one embodiment of the invention. It is to be understood, however, that the description is not to be taken in a limiting sense, the scope of the invention being defined by the appended claims.

IN THE DRAWINGS

Figure 1:
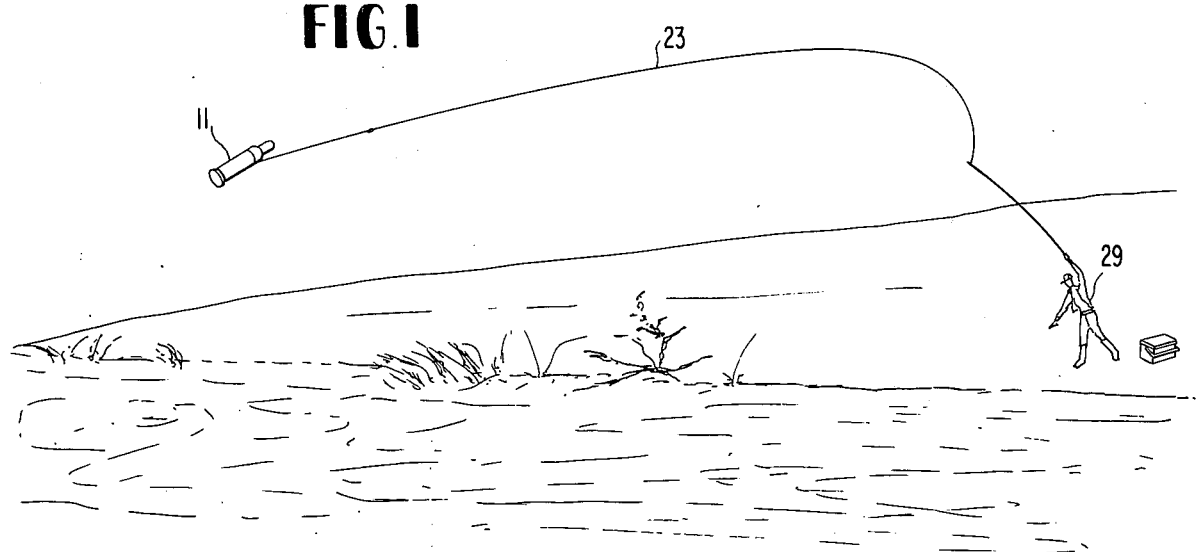
FIG. 1 is illustrative of a fisherman casting the present invention.

Referring to the drawings wherein like reference characters designate corresponding parts throughout the several figures, the bait casting float of the present invention is indicated by numeral 11. The float 11 comprises, generally, a bait cup or bait receiving area 12 and a float chamber 13. This configuration of the bait cup 12 is that of an elongated cylindrical member having an open end which terminates in an area whereby the lip of the cup is flared outwardly as indicated by numeral 14. The side walls of the cup are of thin wall construction, preferably of molded plastic or any other suitable material, and it is envisioned that the present invention may be molded as a unitary member.

Figure 3:
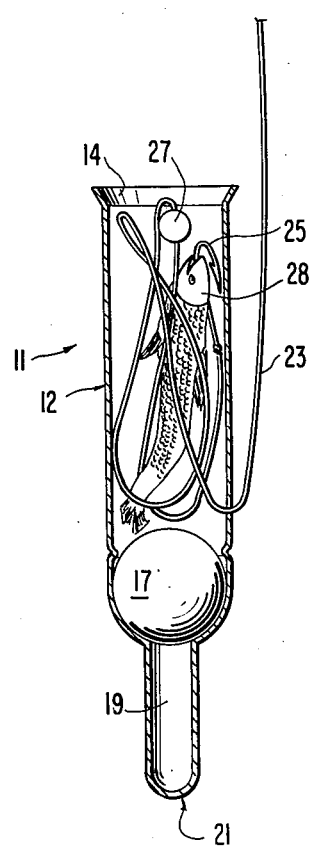
FIG. 3 shows the bait being placed in operative relationship with respect to the invention prior to casting.

The length of the bait cup 12 is such that normal, small bait may be positioned therein as shown in FIG. 3, and yet be small enough to be easily handled by a fisherman and to provide the proper operating characteristics needed. The other end of the bait cup 12 terminates at the float chamber 13. The juncture of the bait cup 12 and the float chamber 13 may be easily seen in the figures as a retaining ring 15 which, in the preferred embodiment is preferably molded into the unitary body of the float 11, and which projects as a dimple 16 into the interior of the bait cup 12.

The float chamber 13 is preferably made water tight, and consequently air tight, by the insertion into the elongated cylindrical portion of the bait cup 12 of a buoyant member 17. This buoyant member is a light weight substantially air-filled ball having an outside diameter the same as the internal diameter of the bait cup 12. By such a friction fit, air is trapped within the float chamber 13 after the buoyant member 17 is inserted all the way up the bait cup 12 and lodged against the rounded seat portion 18 of the float chamber. Once the buoyant member 17 has been inserted into the bait cup and forced into its operative rest position against the rounded seat 18, it is retained in such position by the retaining ring 15 which, by means of the internal dimple 16, presses against the body of the buoyant member 17 and prevents its dislodgment from the float chamber 13.

Figure 4:
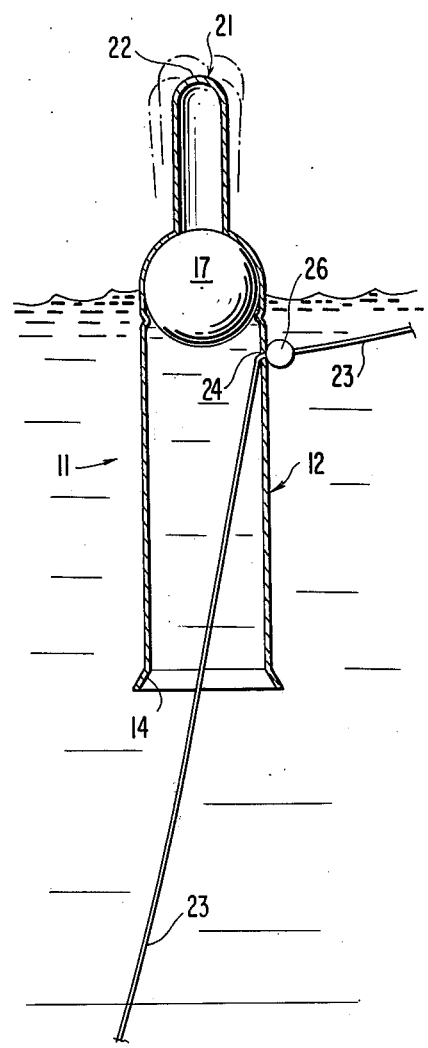
FIG. 4 is illustrative of the invention after it has been cast into the water showing the bait being already dropped therefrom and suspended from the fishing line.

Not only is the buoyant member 17 of a material which makes it substantially air-filled, but is should be of such a material that makes it impervious to the seepage of water or air. When the buoyant member is properly seated, it forms a dead air space 19, within the bobber portion 21 of the float chamber. The bobber 21 is so designed that is projects along the longitudinal center line of the float 11 a substantial distance so that, as seen in FIG. 4, when the float is in the water the bobber portion and a part of the float chamber projects above the surface of the water thereby giving a visual indicator to the fisherman of where the bait is located and ultimately whether or not a fish is striking the bait. The bobber 21 is cylindrical in configuration with a rounded tip 22 and is of a substantially less diameter than the main body of the bait cup 12. To make the bobber 21 to be visually identifiable by the fisherman, it is proposed that the bobber be painted a highly contrasting color with its surrounding environment.

Figure 2:
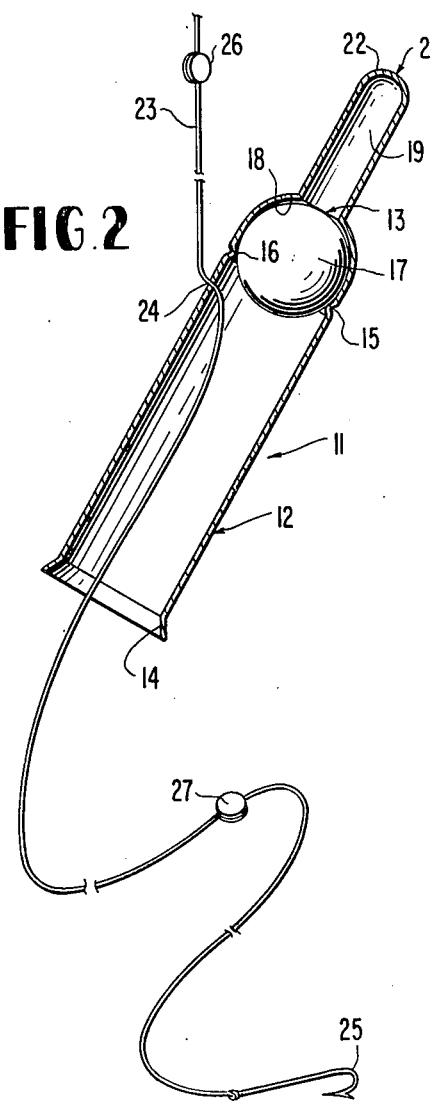
FIG. 2 is a vertical cross-sectional view of the invention showing the fishing line being threaded therethrough prior to the bait being placed into the bait cup.

Referring now especially to FIG. 2, it may be seen that the fishing line 23 is threaded through a line aperture 24 in the side wall of the bait cup 12. Preferably, the line is at the upper portion of the bait cup wall near the buoyant member 17. However, it may be found practical that the line be fed through the bait cup side wall near the flared tip 14 if such would enhance the operation of the device. As the line is fed through the aperture 24, the free end with the hook 25 is adjustable for length by a stop member 26 which is affixed to the line in a slidable frictional relationship therewith. A second stop member 27 is affixed in a slidable friction relationship with the fishing line on the opposite side of the bait cup side wall from stop member 26. Stop member 27 can be also considered a sinker for the fishing line if such is necessary. The fisherman may decide that the stop member 27 is not necessary to his particular needs and this may be dispensed with without detrimental effects to the overall invention. It should also be noted that the aperture 24, while having its primary purpose as a receiving aperture for the fishing line, also acts as an air vent to bleed air from the bait cup once the float 11 is in the water.

While the present invention contemplates a spherical ball of floatation abilities, it has been found that a regular size ping pong ball inserted and seated against the seat 18 provides the necessary floatation.

In operation of the present invention, referring now to FIG. 3 especially, it can be seen that the fishing line, hook and stop member 27 are all confined within the bait cup 12 with a specific bait 28, impaled upon the hook. This particular position is the proper method of loading the bait cup, preparatory to casting. FIG. 1 shows the proper method of casting the bait by fisherman 29 in the normal manner. Once the float 11 has impacted upon the water, it then assumes the upright position as shown in FIG. 4 due to the floatation ability imparted by the buoyant member 17 and the dead air space 19. Due to the effect of gravity, the bait 28 and associated hook, line and sinker will drop from the bait cup 12 and descend to the predetermined depth which the fisherman has programed into the system. This depth is limited by stop member 26. The float 11 acts much like a normal bobber inasmuch as the upper portion 21 rests above the water's surface to be easily seen by the fisherman. When a game fish strikes the bait and hook, this obviously pulls the bobber under the surface, somewhat, indicating to the fisherman that he has a bite upon the line. At this point normal fishing procedure would then be utilized.

While I have particularly shown and described one particular embodiment of the invention, it is distinctly understood that the invention is not limited thereto but that modification may be made within the scope of the invention and such variations as are covered by the scope of the appended claims.

What is claimed is:

1. A combination bait casting and fishing float comprising an elongated thin walled tube adapted to be closed at the distal end and open at the proximal end, said tube being divided into a bait cup section and a float chamber section, the proximal end of the said tube being flared outwardly with respect to the longitudinal center line of said tube to form a lip, aperture means in the wall of said cup section tube adapted to admit a fishing line therethrough, said aperture means further comprising an air vent adapted to allow discharge of entrapped air within the cup section to escape to the ambient atmosphere, the distal end of said tube having a retaining ring integral therewith, said retaining ring being formed in the wall of said tube and projecting through said wall to form a retaining dimple within the interior of said tube, said retaining dimple disposed about the entire interior circumference of said tube, the distal end of said tube forming the float chamber section, said float chamber section comprising a housing of the same tubular configuration as the said tube and terminating in a rounded nose, the rounded nose having an aperture therethrough from which there projects an elongated closed ended tube along the axial center line of the fishing float and whose diameter is substantially less than that of the bait cup section, floatation means retained within the float chamber section by means of the retaining ring and so positioned against the rounded nose so as to block the aperture to the elongated close-ended tube thereby forming a dead air space within said close-ended tube, said floatation means being a spherical ball.

2. The float as claimed in claim 1, wherein said spherical ball comprises a ping pong ball.

* * * * *